(12) United States Patent
Diekmann et al.

(10) Patent No.: US 11,920,008 B2
(45) Date of Patent: *Mar. 5, 2024

(54) POLYMER COMPOSITION FOR SELECTIVE SINTERING METHODS

(71) Applicant: Evonik Operations GmbH, Essen (DE)

(72) Inventors: Wolfgang Diekmann, Waltrop (DE); Maik Grebe, Bochum (DE); Franz-Erich Baumann, Duelmen (DE); Wolfgang Christoph, Marl (DE); Sylvia Monsheimer, Haltern am See (DE); Beatrice Küting, Marl (DE)

(73) Assignee: Evonik Operations GmbH, Essen (DE)

( * ) Notice: Subject to any disclaimer, the term of this patent is extended or adjusted under 35 U.S.C. 154(b) by 120 days.

This patent is subject to a terminal disclaimer.

(21) Appl. No.: 17/510,697

(22) Filed: Oct. 26, 2021

(65) Prior Publication Data

US 2022/0098372 A1 Mar. 31, 2022

Related U.S. Application Data

(63) Continuation of application No. 15/781,168, filed as application No. PCT/EP2016/080993 on Dec. 14, 2016, now Pat. No. 11,186,688.

(30) Foreign Application Priority Data

Dec. 14, 2015 (DE) .......................... 102015016131.8

(51) Int. Cl.
| | |
|---|---|
| *C08J 3/14* | (2006.01) |
| *B29C 64/153* | (2017.01) |
| *B33Y 70/00* | (2020.01) |
| *C08F 6/12* | (2006.01) |
| *C08J 9/24* | (2006.01) |
| *C08L 77/02* | (2006.01) |
| *C08L 77/06* | (2006.01) |

(52) U.S. Cl.
CPC .............. *C08J 3/14* (2013.01); *B29C 64/153* (2017.08); *B33Y 70/00* (2014.12); *C08L 77/02* (2013.01); *C08L 77/06* (2013.01); *C08F 6/12* (2013.01); *C08J 9/24* (2013.01); *C08J 2201/0502* (2013.01); *C08J 2201/0522* (2013.01); *C08J 2205/042* (2013.01); *C08J 2377/00* (2013.01); *C08J 2377/02* (2013.01); *C08J 2377/06* (2013.01)

(58) Field of Classification Search
None
See application file for complete search history.

(56) References Cited

U.S. PATENT DOCUMENTS

| | | |
|---|---|---|
| 3,022,542 A | 2/1962 | Davis |
| 5,270,445 A | 12/1993 | Hou |
| 5,932,687 A | 8/1999 | Baumann et al. |
| 6,103,786 A | 8/2000 | Hoch et al. |
| 8,591,797 B2 | 11/2013 | Monsheimer et al. |
| 8,865,053 B2 | 10/2014 | Monsheimer et al. |
| 9,512,285 B2 | 12/2016 | Corriol |
| 9,643,359 B2 | 5/2017 | Baumann et al. |
| 10,369,745 B2 | 8/2019 | Lescoche et al. |
| 10,406,745 B2 | 9/2019 | Baumann et al. |
| 2004/0137228 A1 | 7/2004 | Monsheimer et al. |
| 2006/0244169 A1 | 11/2006 | Monsheimer et al. |
| 2007/0238056 A1 | 10/2007 | Baumann et al. |
| 2012/0315483 A1 | 12/2012 | Baumann et al. |
| 2013/0055924 A1 | 3/2013 | Seo et al. |
| 2013/0307196 A1 | 11/2013 | Corriol et al. |
| 2015/0152233 A1 | 6/2015 | Corriol |
| 2016/0121271 A1 | 5/2016 | Lescoche et al. |
| 2018/0036938 A1 | 2/2018 | Baumann et al. |
| 2019/0275731 A1 | 9/2019 | Baumann et al. |

FOREIGN PATENT DOCUMENTS

| | | |
|---|---|---|
| CN | 1807508 | 7/2006 |
| CN | 103249760 | 8/2013 |
| EP | 0 863 173 | 9/1998 |
| FR | 2 991 622 | 12/2013 |
| FR | 3 006 606 | 12/2014 |
| JP | 2004-114685 | 4/2004 |
| JP | 2007-534524 | 11/2007 |
| JP | 2013-527269 | 6/2013 |
| WO | 2011/068830 | 6/2011 |
| WO | 2011/124588 | 10/2011 |
| WO | 2012/076528 | 6/2012 |
| WO | 2015/044688 | 4/2015 |

OTHER PUBLICATIONS

International Search Report mailed in PCT/EP2016/080993 dated Mar. 21, 2017.
Office Action dated Aug. 27, 2019 in Japanese Application No. 2018-530856.
Search Report dated Apr. 9, 2020 in Chinese Application No. 201680073354.6.
Written Opinion of the International Searching Authority mailed in PCT/EP2016/080993 dated Mar. 21, 2017.
European Search Report dated Feb. 8, 2023, in European Application No. 16820206.7, 16 pages, with enclosures.

*Primary Examiner* — Richard A Huhn

(74) *Attorney, Agent, or Firm* — Grüneberg and Myers PLLC

(57) ABSTRACT

A polymer composition can be used for selective absorbing sintering, SAS, or selective inhibition sintering, SIS. The polymer has open mesopores and the cumulative pore volume distribution of the mesopores, measured to DIN 66134, is at least 0.01 cm³/g.

16 Claims, No Drawings

POLYMER COMPOSITION FOR SELECTIVE SINTERING METHODS

CROSS-REFERENCE TO RELATED APPLICATIONS

This application is a continuation of U.S. application Ser. No. 15/781,168, filed on Jun. 4, 2018, which was the National Stage entry under § 371 of International Application No. PCT/EP2016/080993, filed on Dec, 14, 2016, and which claims the benefit of priority to German Application No. 102015016131.8, filed on Dec. 14, 2015. The content of each of these applications is hereby incorporated by reference in its entirety.

BACKGROUND OF THE INVENTION

Field of the Invention

The present invention relates to polymer compositions for use in selective absorbing sintering, SAS, or selective inhibition sintering, SIS, and to the use thereof. The invention further relates to shaped bodies and to the production thereof.

Description of Related Art

Additive manufacturing methods, frequently also referred to as rapid prototyping, are used in order to be able to quickly and inexpensively manufacture three-dimensional objects. This manufacturing is effected directly on the basis of the in-computer data model from shapeless (liquids, powders or the like) or shape-neutral (in ribbon or wire form) material by means of chemical and/or physical processes. Polymer powders in particular are suitable as shapeless material.

Powder bed fusion methodology includes, among other techniques, direct metal laser sintering (DMLS), electron beam melting (EBM), selective heat sintering (SHS), selective laser melting (SLM), selective laser sintering (SLS), selective absorbing sintering (SAS) and selective inhibition sintering (SIS). The SAS method is described, for example, in US 2007/238056. US 2004/137228 A1 presents the SIS method.

The selectivity of the laser-free processes can be accomplished, for example, via absorbers (selective absorbing sintering, SAS) or inhibitors (selective inhibition sintering, SIS). In the SAS method, the absorption of the matrix in contact with the absorber is increased; by contrast, the inhibitor retards the melting. Absorber and inhibitor can be used together in one method. Suitable energy sources in SAS methods are those that are incorporated into the material only to a limited degree. In the SIS method, the energy source should be chosen such that the material is heated to sufficiently rapidly.

Absorbers and inhibitors can be applied to the material in dissolved or dispersed form in a liquid, for example by means of inkjet methods in the form of inks. The liquid or absorber and inhibitor should merely be absorbed by the material printed and not flow away horizontally or vertically within the material.

The powder material of the prior art is predominantly coated on its surface with absorber or inhibitor via the application of the liquid. However, a disadvantage in the SAS method is that the particles of the powder material exhibit inhomogeneous melting characteristics. This results in reduced layer binding and ultimately in a shaped body having reduced stability properties which can be measured, for example, in the form of reduced elongation at break. A disadvantage in the SIS method is that the inhibitor flows away horizontally or vertically in the event of elevated addition of inhibitor. This results in an indistinct image or component.

SUMMARY OF THE INVENTION

The problem addressed was thus that of providing a polymer composition which can be used in SAS or SIS methods, wherein components having elevated elongation at break, high trueness to shape, sharper edges and better process robustness should be obtained.

Accordingly, polymer compositions for selective absorbing sintering, SAS, or selective inhibition sintering, SIS, have been found, which do not have the disadvantages of the prior art. The polymers have open mesopores, the cumulative pore volume distribution of the mesopores, measured to DIN 66134, being at least 0.01 $cm^3/g$. Preferably, the cumulative pore volume distribution is at least 0.025 $cm^3/g$ and preferably at least 0.035 $cm^3/g$. Particularly preferred cumulative pore volume distributions are respectively at least 0.045 $cm^3/g$, 0.05 $cm^3/g$, 0.06 $cm^3/g$ and 0.07 $cm^3/g$. Preferably, the cumulative pore volume distribution is not more than 0.15 $cm^3/g$ and more preferably not more than 0.1 $cm^3/g$. In a preferred embodiment, the cumulative pore volume distribution is 0.05 $cm^3/g$ to 0.15 $cm^3/g$, more preferably 0.06 $cm^3/g$ to 0.1 $cm^3/g$.

DETAILED DESCRIPTION OF THE INVENTION

Through the open pores, absorber or inhibitor moves from the surface into the particle interior and can thus enable more homogeneous distribution of these substances. This results in more homogeneous melting. In addition, horizontal or vertical running off a liquid is prevented, since the liquid is absorbed in a relatively high amount by the particles—by contrast with superficial absorption. The shape bodies producible therefrom, compared to the prior art, have elevated elongation at break, higher trueness to shape, sharper edges and better process robustness.

The pores bring about, through capillary forces, absorption of absorber or inhibitor in the form of the liquid. The effect of the cumulative pore volume distribution of at least 0.01 $cm^3/g$ is that absorber or inhibitor is absorbed very quickly; ultimately, during the SAS or SIS method, it is customary for temperatures to exceed 100° C., which lead to rapid evaporation of the liquid. In this case, absorbers or inhibitors should not run or merge into one another. If the cumulative pore volume distribution were to be below at least 0.01 $cm^3/g$, the liquid would evaporate before absorber or inhibitor had penetrated into the particles. Absorber would thus remain on the surface of the particles as in the prior art, and the inhibitor would achieve low inhibitor performance.

Open pores of the particles are connected to the surrounding medium, whereas closed pores are intrinsically closed off and do not allow any medium to penetrate. Fine pores having a diameter of 20 μm or less are subdivided by IUPAC into macropores (>50 nm), mesopores (2-50 nm) and macropores (<2 nm). A preferred polymer composition has at least 30%, more preferably at least 50%, open mesopores, based in each case on the sum total of open macro- and mesopores of the polymer composition having a pore diameter of 2 to 300 nm, measured to DIN 66134. The standard applies to mesoporous solids, but the range above 50 nm was likewise determined according to this standard.

Polymers having micropores are less suitable, since they cannot absorb the liquid quickly enough and cannot absorb customary absorbers at all. Macropores can exhibit reduced capillary action and likewise do not lead to sufficiently rapid absorption of the liquid containing absorber or inhibitor into the particle interior.

The polymer composition preferably absorbs 1000 pl to 30 000 pl of liquid per g of polymer composition, preferably 3000 pl to 25 000 pl and more preferably 5000 pl to 20 000 pl.

Suitable liquid is typically any compressible liquid which contains absorber or functions as inhibitor. The liquid in which the absorber or the inhibitor is dissolved or dispersed is preferably selected from the solvents water, monoalcohols having 1 to 4 carbon atoms, glycol or mixtures thereof.

In one embodiment of the invention, the polymer composition includes either absorbers or inhibitors. For this purpose, the composition has been contacted with the liquid described above. This can be effected, for example, by known printing methods. In this respect, a process for producing this polymer composition, wherein the polymer composition according to the invention is contacted, preferably printed, with absorber or inhibitor, forms a further part of the subject-matter of the invention.

The absorbers or inhibitors may be colourants. "Colourant" is the umbrella term for all colouring substances. They can be divided into dyes and pigments by their solubility in the surrounding medium according to DIN 55944:1990-04. Dyes are organic black or coloured substances that are soluble in the surrounding medium. Pigments, by contrast, are colourants in the form of powders or platelets that, by contrast with dyes, are insoluble in the surrounding medium. The particle size is typically 30 to 200 nm (laser diffraction). The colourant is preferably a pigment. Preferably, the pigment is selected from the group consisting of organic and inorganic, colour, effect, colour and effect, magnetically shielding, electrically conductive, corrosion-inhibiting, fluorescent and phosphorescent pigments. Preference is given to using the colour and/or effect pigments.

Suitable pigments are selected from chalk, ochre, umber, green earth, burnt sienna, graphite, titanium white (titanium dioxide), lead white, zinc white, lithopone, antimony white, carbon black, iron oxide black, manganese black, cobalt black, antimony black, lead chromate, lead oxide red, zinc yellow, zinc green, cadmium red, cobalt blue, Prussian blue, ultramarine, manganese violet, cadmium yellow, Paris green, molybdate orange, molybdate red, chromium orange, chromium red, iron oxide red, chromium oxide green, strontium yellow, metal effect pigments, pearlescent pigments, luminous pigments comprising fluorescent and/or phosphorescent pigments, gamboge, bone charcoal, Kassel brown, indigo, chlorophyll, azo dyes, indigoids, dioxazine pigments, quinacridone pigments, phthalocyanine pigments, isoindolinone pigments, perylene pigments, perinone pigments, metal complex pigments, alkali blue pigments and diketopyrrolopyrrole.

In order to achieve better processability of the polymer composition, it may be advantageous that additives are added. Additives of this kind may, for example, be free-flow aids. More preferably, the polymer composition includes 0.05% to 5% by weight, preferably from 0.1% to 1% by weight, based on the total weight of the composition, of additives. Free-flow aids may, for example, be fumed silicas, stearates or other free-flow aids known from the literature, for example tricalcium phosphate, calcium silicates, $Al_2O_3$, MgO, $MgCO_3$ or ZnO. Fumed silica is supplied, for example, under the Aerosil® brand name by Evonik Industries AG.

As well as or instead of such free-flow aids, some of which are inorganic, or other additives, the polymer composition may also include inorganic filling materials. The use of such filling materials has the advantage that these essentially retain their shape through the treatment in the bonding operation and hence reduce shrinkage of the shape body. Moreover, it is possible through the use of filling materials, for example, to alter the plastic and physical properties of the objects. Thus, through use of powder material including metal powder, both the transparency and colour and the magnetic or electrical properties of the object can be adjusted. As fillers or filling materials, the powder material may include, for example, glass particles, ceramic particles or metal particles. Typical fillers are, for example, metal granules, aluminium powder, steel shot or glass beads. Particular preference is given to using powder materials including glass beads as filling materials. In a preferred embodiment, the powder material according to the invention includes from 1% to 70% by weight, preferably from 5% to 50% by weight and most preferably from 10% to 40% by weight of filling materials, based on the total weight of the polymer composition.

The surface energy of the liquid should be less than the surface energy of the polymer composition.

The liquid contains the current preferably in proportions of 0.1% to 10% by weight, more preferably 2.5% to 5% by weight, based on the total weight of the liquid. The pH of the liquid is typically adjusted to 6 to 9.

Suitable liquids may be commercial links which are supplied for inkjet printing.

Suitable polymers for the polymer composition may be customary and known polymers. These are preferably selected from polyaryl ether ketones such as polyether ether ketones, polyesters, polyvinyl chloride, polyacetals, polypropylene, polyethylene, polystyrene, polycarbonates, polymethylmethacrylimides, polymethylmethacrylates and polyamides, preference being given to polyamides. Polyamides include homopolyamides and copolyamides. Suitable polyamides or copolyamides are selected from nylon-6, -11, -12, -10,13, -10,12, -6,6, -4,6, -6,13, -10,6 and -12/10, 12. A particularly preferred polyamide is nylon-12. The polyamides may be balanced or unbalanced. Suitable balancing agents are mono-, di- or triamines or mono-, di- or tricarboxylic acids.

Typically, a polymer composition which is used in sintering methods should have a minimum BET surface area. The prior art discloses that the value should, for example, be less than 7 $m^2/g$. The polymer composition according to the invention, by contrast, should preferably have a BET surface area, measured to DIN ISO 9277, of at least 7 $m^2/g$, preferably of 7.5 $m^2/g$ to 30 $m^2/g$. A particularly preferred embodiment includes polyamides having a BET surface area of at least 7 $m^2/g$, preferably of 7.5 $m^2/g$ to 30 $m^2/g$. Above a BET of 30 $m^2/g$, the amount of material per unit volume available for the process is insufficient and hence processibility is no longer adequate.

In a preferred embodiment, the polymer composition has a cumulative pore volume distribution of at least 0.02 $cm^3/g$, more preferably at least 0.025 $cm^3/g$, 0.035 $cm^3/g$, at least 0.04 $cm^3/g$, at least 0.05 $cm^3/g$, at least 0.07 $cm^3/g$ or at least 0.09 $cm^3/g$. Further preferred is a pore volume distribution of at least 0.02 $cm^3/g$ and a BET surface area of at least 2.8 $m^2/g$, preferably 0.04 $cm^3/g$ to 5.8 $m^2/g$, more preferably 0.05 $cm^3/g$ to 10 $m^2/g$ and especially preferably of 0.07 cm³/g to 13 m²/g. Further preferred embodiments comprise a cumulative pore volume distribution of at least 0.035 or at least 0.05 cm³/g and a BET of at least 7.5 m²/g, preferably a cumulative pore volume distribution of 0.07 cm³/g and a BET of at least 10 m²/g, especially preferably 0.09 cm³/g and a BET of at least 10 m²/g.

The weight-average particle diameter $d_{50}$ of the polymer composition, measured by means of laser diffraction, should preferably be not more than 100 µm, preferably 10 µm to 80 µm (Malvern Mastersizer 3000; the wet dispersion is effected in a wet dispersion in water, refractive index and blue light value fixed at 1.52; evaluation via Mie theory). Polymers having such diameters are also referred to as polymer powder.

It is advantageous when the polymer composition with a particle diameter of less than 10.48 µm (ultrafine particles) is present in a small amount. The proportion of ultrafine particles should be less than 3% by weight, preferably less than 1.5% by weight and more preferably less than 0.75% by weight, based in each case on the total weight of polymer composition. This reduces the evolution of dust and enables an improvement in processability. Ultrafine particles can be removed, for example, by means of sifting.

Preference is further given to polymer compositions having a bulk density, measured to DIN 53466, between 300 g/l and 600 g/l.

In addition, polymers in the polymer composition having a surface energy of not more than 35 mN/m, preferably from 25 mN/m to 32 mN/m, are preferred polymers. The surface energy is determined by means of contact angle measurement by the capillary rise height method using the Washburn equation and the evaluation method according to Owens, Wendt, Rabel and Kaelble. Polymer compositions of this kind have very homogeneous flowability, which results in a high dimensional stability of the shaped bodies.

The polymer and its composition can be obtained via a precipitation process. These typically feature a higher cumulative pore volume distribution than polymers which are obtained, for example, by grinding methods. Polymers which are not obtained by a precipitation process but by grinding methods in particular have a cumulative pore volume distribution of generally well below 0.01 cm³/g.

In the precipitation process, the polymer is at least partly dissolved at elevated temperature and then precipitated by reducing the temperature. Suitable solvents for polyamides are, for example, alcohols, preferably C1-C4-monoalcohols such as ethanol. U.S. Pat. No. 5,932,687 mentions suitable process conditions, for example. The process comprises the steps of a) at least partly dissolving the polymer composition at a temperature of 10 K to 60 K above the dissolution temperature of the particular polymer composition and then b) reducing the temperature down to the precipitation temperature to obtain a suspension. The dissolution temperature corresponds to the clearing point of the polymer composition in the solvent. At the precipitation temperature, heat is involved as a result of the precipitation of the polymer composition (visually perceptible by turbidity).

To establish the desired porous nature of the polymer composition, it is advantageous to leave the suspension obtained at a temperature of 2-10 K, preferably 2-6 K and more preferably 2-4 K above the precipitation temperature for 10 min to 180 min after the precipitation. It is particularly advantageous to dissolve the polymer composition in step a) at an elevated dissolution temperature of 40 K to 60 K and to conduct the precipitation (step b) at a temperature 3 K above the precipitation temperature or higher, preferably not more than 10 K.

The person skilled in the art is aware that sifting and sieving as an aftertreatment step for attainment of the desired particle distribution are standard and in some cases necessary classification methods.

The invention further provides for the use of the polymer composition according to the invention in SAS or SIS methods for production of shaped bodies. It is preferable here to contact the polymer composition with the liquid.

In addition, shaped bodies which are obtained at least partly from polymer compositions according to the invention form a further part of the subject-matter of the invention. Furthermore, processes for producing shaped bodies by means of SAS or SIS methods, wherein the polymer composition according to the invention is used, likewise form part of the subject-matter of the invention.

EXAMPLES

Example 1: Reprecipitation of Nylon-12 (PA 12)

400 kg of balanced PA 12 prepared by hydrolytic polymerization and having a relative solution viscosity of 1.57 and an end group content of 118 mmol/kg COOH or 9 mmol/kg NH2 were brought to 156° C. together with 1500 l of ethanol, denatured with 2-butanone and with water content 1%, in a 3000 l stirred tank, equipped with a paddle mixer, within 2.5 hours and left at this temperature while stirring at 75 rpm for 1 hour. Subsequently, the jacket temperature is reduced to 124° C. and, while continuously distilling the ethanol off at a cooling rate of 25 K/h at the same stirrer speed, the internal temperature is brought to 125° C. From then on, the jacket temperature was kept 2 K-3 K below the internal temperature at the same cooling rate. Thereafter, distillative removal was continued at a cooling rate of 40 K/h and hence the internal temperature was brought to 109° C. At this temperature, precipitation set in, noticeable from the evolution of heat. The distillation rate was increased until the internal temperature did not rise above 110° C. After 5 minutes, the internal temperature declined, which indicated the end of precipitation. Then the jacket temperature was raised again, by a maximum of 3° C., over a period of 80 min, before the temperature of the suspension was brought to 45° C. by further distillative removal and cooling via the shell and the suspension was then transferred into a paddle dryer. The ethanol was distilled off at 70° C./400 mbar and then the residue was subjected to further drying at 20 mbar/86° C. for three hours. This gave a precipitated PA 12 having a mean particle diameter of 91 µm. The bulk density was 435 g/l.

Example 2: Reprecipitation of Nylon-11 (PA 11)

The polyamide was prepared according to example 7 of the U.S. Pat. No. 8,865,053 with a different internal temperature of 106° C. This gave a precipitated PA 11 having a mean particle diameter of 50 µm. The bulk density was 450 g/l.

Example 3: Reprecipitation of Nylon-12 (PA 12)

60 kg of balanced PA 12 prepared by hydrolytic polymerization and having a relative solution viscosity of 1.57 and an end group content of 118 mmol/kg COOH or 8 mmol/kg NH2 were brought to 145° C. together with 250 l of ethanol, denatured with 2-butanone and with water content 1%, in an 800 l stirred tank at 110 rpm within 2.5 hours and left at this temperature while stirring for 1 hour. Subsequently, the jacket temperature is reduced to 124° C. and, while continuously distilling the ethanol off at a cooling rate of 25 K/h at the same stirrer speed, the internal temperature is brought to 125° C. From then on, the jacket temperature was kept 2 K-3 K below the internal temperature at the same cooling rate. The internal temperature was brought to 117° C. at the same cooling rate and then kept constant for 60 minutes. Thereafter, distillative removal was continued at a cooling rate of 40 K/h and hence the internal temperature was brought to 111° C. At this temperature, precipitation set in, noticeable from the evolution of heat. The distillation rate was increased until the internal temperature did not rise above 111.3° C. After 25 minutes, the internal temperature declined, which indicated the end of precipitation. Then the jacket temperature was raised again, by a maximum of 2° C., over a period of 35 min, before the temperature of the suspension was brought to 45° C. by further distillative removal and cooling via the shell and the suspension was then transferred into a paddle dryer. The ethanol was distilled off at 70° C./400 mbar and then the residue was subjected to further drying at 20 mbar/86° C. for three hours.

This gave a precipitated PA 12 having a mean particle diameter of 62 μm. The bulk density was 394 g/l.

Example 4: Reprecipitation of Nylon-12 (PA 12)

60 kg of partly balanced PA 12 prepared by hydrolytic polymerization in the presence of 0.4% dodecanedioic acid and having a relative solution viscosity of 1.57 and an end group content of 80 mmol/kg COOH or 40 mmol/kg NH2 were brought to 147° C. together with 250 l of ethanol, denatured with 2-butanone and with water content 1%, in an 800 l stirred tank within 2.5 hours and left at this temperature while stirring for 1 hour.

Subsequently, the jacket temperature is reduced to 124° C. and, while continuously distilling the ethanol off at a cooling rate of 25 K/h at the stirrer speed of 108 rpm, the internal temperature is brought to 125° C. From then on, the jacket temperature was kept 2 K-3 K below the internal temperature at the same cooling rate. Thereafter, distillative removal was continued at a cooling rate of 40 K/h and hence the internal temperature was brought to 109° C. At this temperature, precipitation set in, noticeable from the evolution of heat. The distillation rate was increased until the internal temperature did not rise above 110° C. After 5 minutes, the jacket temperature was raised again, by a maximum of 4° C., over a period of 140 min, before the temperature of the suspension was brought to 45° C. by further distillative removal and cooling via the shell and the suspension was then transferred into a paddle dryer. The ethanol was distilled off at 70° C./400 mbar and then the residue was subjected to further drying at 20 mbar/86° C. for three hours.

This gave a precipitated PA 12 having a mean particle diameter of 63 μm. The bulk density was 311 g/l.

Example 5: Nylon-12/10,12 (PA 12/1012)

The polyamide was prepared according to example 7 of the U.S. Pat. No. 8,591,797. The pellets obtained were ground at low temperature by means of a pinned disc mill. This gave a ground nylon-12/10,12.

Example 6: Reprecipitation of Nylon-12 (PA 12) in the Presence of Glass Beads

In accordance with Example 4, 60 kg of the following partly balanced PA12, rel. solution viscosity 1.78, COOH end groups 65 mmol/kg, NH2 end groups 29 mmol/kg, are reprecipitated under the following altered conditions in 250 l of EtOH in the presence of 40% by mass of glass beads (Swarcoforce C40-80):

Stirrer speed 110 rpm. Dissolution temperature: 149° C., 2 hours. Precipitation temperature: nucleation phase prior to the actual precipitation at 115° C./30 min, followed by main precipitation phase at 109° C. The drying is effected as in Example 4.

Example 7: Reprecipitation of Partly Balanced PA12

In accordance with Example 4, 60 kg of the following partly balanced PA12, rel. solution viscosity 1.68, COOH end groups 75 mmol/kg, NH2 end groups 49 mmol/kg, are reprecipitated under the following altered conditions in 250 l EtOH:
Dissolution temperature: 175° C.
Precipitation temperature: 114° C.
The drying is effected as in Example 4.

Example 8: Reprecipitation of Partly Balanced PA12

Example 7 repeated with the same starting polyamide under the following conditions:
Dissolution temperature: 175° C.
Precipitation temperature: 115° C.
The drying is effected as in Example 4.

Example 9: Reprecipitating PA613

According to Example 4, 40 kg of a PA 613 pellet specimen (rel. solution viscosity 1.81) are reprecipitated under the following precipitation conditions:
Dissolution temperature: 175° C.
Precipitation temperature: 128° C.

Example 10: Coprecipitation of PA12 and PA1013

According to Example 4, 60 kg of a pellet mixture of unbalanced PA12 (rel. solution viscosity 1.62) and PA1013 (rel. solution viscosity 1.64) in a mass ratio of 85:15 are reprecipitated under the following modified precipitation conditions:
Dissolution temperature: 175° C.
Precipitation temperature: 112° C.

Example 11: Reprecipitating PA106

According to Example 4, 60 kg of a PA 106 pellet specimen (rel. solution viscosity 1.84) are reprecipitated under the following modified precipitation conditions:
Dissolution temperature: 175° C.
Precipitation temperature: 142° C.

Example 12: Reprecipitating PA106

According to Example 4, 60 kg of a PA 106 pellet specimen (rel. solution viscosity 1.62) are reprecipitated under the following modified precipitation conditions:
Dissolution temperature: 175° C.
Precipitation temperature: 142° C.

Example 13: Reprecipitation of PA66

According to Example 4, 40 kg of a PA 66 pellet specimen (rel. solution viscosity 1.61) are reprecipitated under the following modified precipitation conditions:

Dissolution temperature: 175° C.
Precipitation temperature: 157° C.

Example 14: Reprecipitating PA12

Example 3 is repeated with a dissolution temperature of 171° C. and a precipitation temperature of 114° C.

The pore volume was ascertained according to DIN 66134 in a double determination.

TABLE 1 cumulated pore volume of the polyamide compositions

| Example | Polyamide | Mode of preparation | $d_{50}$ | Cumulated pore volume in cm$^3$/g |
|---------|-----------|---------------------|----------|-----------------------------------|
| 1 | PA12 | precipitation | 91 μm | 0.015 |
| 2* | PA11 | precipitation | 50 μm | 0.002 |
| 3 | PA12 | precipitation | 62 μm | 0.037 |
| 4 | PA12 | precipitation | 63 μm | 0.072 |
| 5* | PA12/1012 | grinding | not determined | 0.0006 |
| 6 | PA12 | precipitation | 56 | 0.052 |
| 7 | PA12 | precipitation | 63 | 0.12 |
| 8 | PA12 | precipitation | 63 | 0.091 |
| 9 | PA613 | precipitation | 59 | 0.088 |
| 10 | PA12/1013 | precipitation | 46 | 0.101 |
| 11 | PA106 | precipitation | 54 | 0.053 |
| 12 | PA106 | precipitation | 40 | 0.111 |
| 13 | PA66 | precipitation | 50-80 | 0.127 |
| 14 | PA12 | precipitation | 58 | 0.053 |

*non-inventive

The invention claimed is:

1. A process for producing a polymer composition for selective absorbing sintering or selective inhibition sintering, the process comprising:
   a) at least partly dissolving a polymer in a solvent at a temperature of 10 K to 60 K above a dissolution temperature of the polymer, and then
   b) reducing the temperature down to a precipitation temperature to obtain the polymer composition in the form of a suspension;
   wherein the polymer composition comprises open mesopores, and wherein a cumulative pore volume distribution of the mesopores, measured according to DIN 66134, is 0.01 to 0.15 cm$^3$/g and
   said polymer is at least one selected from the group consisting of a polyaryl ether ketone, a polyester, a polyvinyl chloride, a polyacetal, a polypropylene, a polyethylene, a polystyrene, a polycarbonate, a polymethylmethacrylimide, a polymethylmethacrylate and a polyamide.

2. The process according to claim 1, wherein the cumulative pore volume distribution is at least 0.025 cm$^3$/g.

3. The process according to claim 1, wherein the cumulative pore volume distribution is at least 0.035 cm$^3$/g.

4. The process according to claim 1, wherein at least 30% of a sum total of open macro- and mesopores of the polymer composition having a pore diameter of 2 to 300 nm, measured according to DIN 66134, are open mesopores.

5. The process according to claim 1, wherein at least 50% of a sum total of open macro- and mesopores of the polymer composition having a pore diameter of 2 to 300 nm, measured according to DIN 66134, are open mesopores.

6. The process according to claim 1, wherein the polymer composition absorbs liquid in a volume of 1,000 pl/g to 30,000 pl/g.

7. The process according to claim 1, wherein a BET surface area of the polymer composition, measured to DIN ISO 9277, is 7 to 30 m$^2$/g.

8. The process according to claim 1, wherein a BET surface area of the polymer composition, measured to DIN ISO 9277, is from 10 m$^2$/g to 30 m$^2$/g.

9. The process according to claim 1, wherein a weight average particle diameter $d_{50}$ of the polymer composition, measured by laser diffraction, is not more than 100 μm.

10. The process according to claim 1, wherein a weight average particle diameter $d_{50}$ of the polymer composition, measured by laser diffraction, is from 10 μm to 80 μm.

11. The process according to claim 1, wherein a surface energy of the polymer in the polymer composition is 25 to 35 mN/m, determined by a contact angle measurement by a capillary rise height method using a Washburn equation and an evaluation method according to Owens, Wendt, Rabel and Kaelble.

12. The process according to claim 1, wherein a surface energy of the polymer in the polymer composition is from 25 mN/m to 32 mN/m, determined by a contact angle measurement by a capillary rise height method using a Washburn equation and an evaluation method according to Owens, Wendt, Rabel and Kaelble.

13. The process according to claim 1, wherein the polymer composition further comprises an absorber or an inhibitor.

14. The process according to claim 1, further comprising:
   keeping the suspension, after precipitation, at a temperature of 2-10 K above the precipitation temperature for 10 to 180 min.

15. The process according to claim 1, wherein in a), the at least partly dissolving is effected at a dissolution temperature of 40 K to 60 K, and
   wherein in b), the temperature is reduced to a temperature of 3 K above the precipitation temperature or higher.

16. The process according to claim 1, the process further comprising:
   performing selective absorbing sintering or selective inhibition sintering with a polymer composition, to shape the polymer composition into a shaped body.

* * * * *